Sept. 15, 1959
A. F. REFICE
2,904,289
RESILIENT MOUNTING MEANS
Filed July 18, 1957
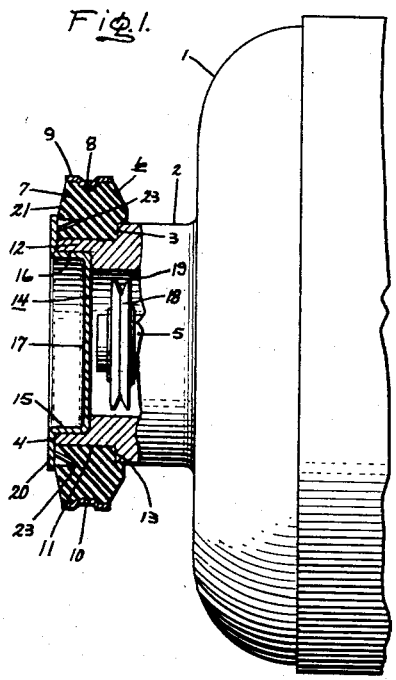
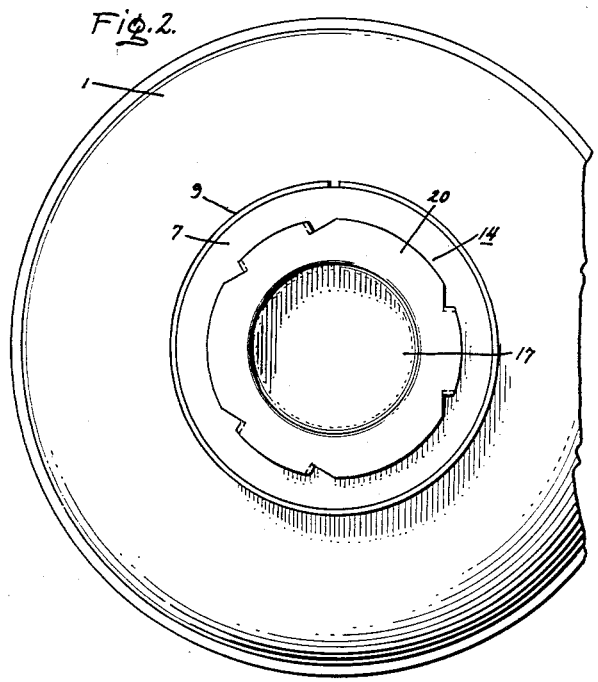
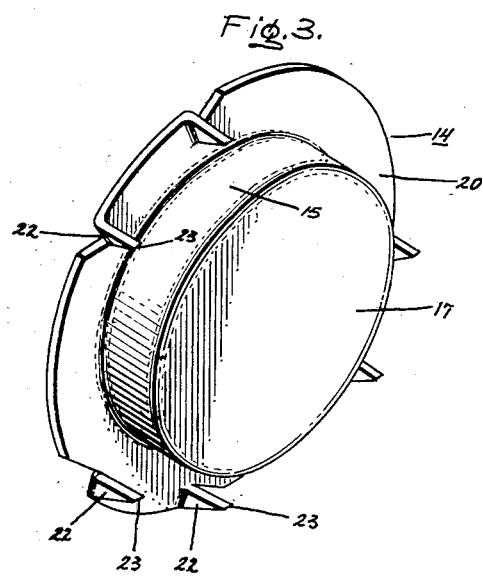
Inventor:
Alfred F. Refice,
by
His Attorney.

United States Patent Office 2,904,289
Patented Sept. 15, 1959

2,904,289

RESILIENT MOUNTING MEANS

Alfred F. Refice, De Kalb, Ill., assignor to General Electric Company, a corporation of New York Application July 18, 1957, Serial No. 672,713

3 Claims. (Cl. 248—26)

This invention relates to resilient mounting means for rotating machinery, and more particularly to resilient mounting means having positive provisions for the elimination of undesirable movements of the mounting.

It is well known to use resilient mountings, such as that shown in Patent 2,074,136 Welch, assigned to the assignee of the present application, for cushioning the vibrations of rotating machinery. These resilient mountings are normally mounted about a hub at each end of the machine; since there is usually a bearing mounted in each hub, it is also necessary to close the end of the hub to prevent loss of lubricant from the bearing structure. Previously, the bearing-closing structure and the resilient mounting have usually been entirely separate, requiring separate parts. Their physical proximity, and the cost of separate manufacture, make it desirable to provide an integral structure which will achieve both functions, that is, the structure for closing the end of the hub to enclose the bearing will also serve as part of the resilient mounting.

In the past, various means have been attempted to maintain the resilient mounting completely stationary on the machine hub so that there would be neither axial nor rotary movement of the mounting relative to the hub. While this has been achieved in satisfactory fashion, it added noticeably to the cost of the mounting. It is proposed in the present invention to provide means which will not only eliminate separation of the hub closing portion and the resilient mounting, but will maintain the resilient mounting stationary on the machine hub. It is further proposed to effect the above aims by means of a structure which is simple to manufacture and economical to produce, without requiring modification of the resilient annulus of the mounting from the relatively simple shape which has been in general use to date.

It is therefore an object of this invention to provide a resilient mounting structure which will both perform a hub-closing function and retain the resilient mounting stationary on the machine hub by positive engagement therewith.

It is a further object of the invention to achieve this end without modification of the resilient mounting in any way from the economical form in general use at the present time.

Further objects and advantages of this invention will become apparent and the invention will be better understood by reference to the following description and the accompanying drawing, and the features of novelty which characterize this invention will be pointed out with particularity in the claims annexed to and forming a part of this specification.

The invention, in one embodiment thereof, provides a resilient mounting which has an annulus of resilient material mounted on a machine hub against a shoulder of the hub. A thin sheet metal member, provided for securing the mounting against axial and rotary movement relative to the hub, has a portion closing the end of the hub. A first annular flange extends substantially axially from the periphery of the closing portion of the sheet metal member, and is tightly secured within the end of the hub by engagement with the inner surface of the hub. A second annular flange member extends substantially radially outward from the end of the axially extending flange into axial engagement with the resilient annulus; in addition, the second flange has a plurality of substantially axially extending pointed tangs formed therefrom. When the parts are in their assembled position, these tangs are embedded in the annulus positively to prevent any movement thereof on the hub.

In the drawing, Figure 1 is a fragmentary side view, partly in cross section, of a rotary machine having the improved resilient mounting structure.

Figure 2 is an end view of the structure of Figure 1; and

Figure 3 is a view in perspective of the improved securing and closing member of the invention.

Referring now to the figures of the drawing, there is shown a casing 1 for a rotary machine such as, for instance, an electric motor. Casing 1 terminates in a hub portion 2 having a shoulder 3 at a predetermined distance from end 4 of the hub. The rotatable shaft 5 of the machine is rotatably mounted within the hub by a bearing structure (not shown) which is secured within the hub.

In order to mount the machine to a base (not shown) so that the vibrations from the machine will be substantially prevented from reaching the base, there is provided a resilient mounting, generally indicated at 6, of the general type described in the aforementioned Welch patent. Mounting member 6 has an annulus 7 composed of a resilient material, such as rubber. The outer surface of annulus 7 has a peripheral groove 8 therein, and an outer metallic ring 9 has a similar mating indentation 10. The inner surface 11 is formed to fit snugly about part 12 of hub 2 when the resilient mounting member 6 is positioned thereon. Surface 13 of the annulus is arranged to abut against shoulder 3 of hub 2 when the annulus 7 is mounted on hub part 12, as shown. Annulus 7 represents a readily available article which, because of the simple configuration with which it is provided, is relatively inexpensive.

A member 14 formed of thin sheet metal is mounted over end 4 of hub 2 so that an axially extending flange 15 formed on the member tightly engages the inner surface 16 of the hub 4 to secure member 14 in position. Member 14 is also provided with a central portion 17 which effectively closes the end of hub 2 so as to form a closure therefor. This prevents foreign matter from entering the bearing located within the hub, and helps prevent loss of lubricant from the bearing which may, as shown, be provided with a lubricant slinger 18 and a felt strip 19 for conducting lubricant back into the bearing from the lubricant slinger. As shown, flange 15 extends from the periphery of central portion 17.

Member 14 is also provided with a second annular flange 20 which extends outwardly from the end of flange 15 in a substantially radial direction. Flange 20 is arranged in engagement with surface 21 of annulus 7 so that the annulus is effectively secured between shoulder 3 of hub 4 and flange 20. However, the greatest tendency to cause movement of mounting 6 on hub 4 usually comes from the torsional vibrations of the machine. To provide positive prevention for this occurrence, flange 20 has a plurality of substantially axially extending tangs 22 formed therefrom. The tangs terminate in sharp points 23 and, in the preferred embodiment, are formed in planes which are substantially perpendicular to the direction in which mounting 6 tends to turn on hub portion 12. The fact that member 14 is made of thin sheet material makes it a very simple matter to form the tangs 22 from the flange 20 as shown. A further feature of the preferred embodiment of the invention is that the tangs are formed in pairs, with one of the tangs being bent clockwise out of the plane of flange 20 and the other tang of each pair being bent counterclockwise out of the plane of flange 20. With the tangs 22 formed in the manner described for the preferred embodiment, the broad part of the tangs opposes the tendency of mounting 6 to rotate. In addition, the fact that the tangs are bent out of the plane of flange 20 in both counterclockwise and clockwise directions means that, regardless of the direction of the torsional force on mounting 6, one of the tangs is forced even farther out of the plane of flange 20 by any turning tendency of the mounting. Again, this constitutes optimum utilization of the resisting characteristics of the tang.

It will be seen from the foregoing that the structure described provides a unitary member which acts as a part of the resilient mounting to secure it immovably on hub 2, and at the same time forms a closure for the end of the hub to provide the necessary protection to apparatus located within the hub 2 of housing 1. The fact that a single member fulfills these functions in lieu of the plurality of elements which has heretofore generally been required permits a substantial increase in the economy of production. This economy is increased to an even greater degree by the fact that no change whatsoever from the simple commercially available shape of resilient annulus 7 is required for the construction to be effective for the purposes stated. Also, the member is one with a relatively simple shape, formed from economically obtainable material by any standard simple means such as, for instance, punching and stamping. The prevention of any movement by the mounting relative to the machine hub is achieved in a positive manner, and it will be seen that before it would be possible for mounting member 6 to turn relative to hub 2 there would have to be actual destruction of one of the elements of the structure.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In combination with a rotatable machine hub having a shoulder formed thereon, a resilient mounting comprising an annulus of resilient material mounted on said hub against said shoulder, and means for securing said mounting against axial and rotary movement relative to said hub, said means comprising a member of thin sheet metal having a portion closing said hub, a first annular flange extending substantially axially from the periphery of said closing portion and in tight engagement with the inner surface of the end of said hub, and a second annular flange extending substantially radially outward from said first flange into axial engagement with said annulus, said second flange having a pluarlity of substantially axially extending pointed tangs formed therefrom embedded in said annulus.

2. The construction of claim 1 in which said tangs are formed in planes substantially perpendicular to the direction in which said mounting tends to turn on said hub.

3. The construction of claim 1 in which said tangs are formed in planes substantially perpendicular to the direction in which said mounting tends to turn on said hub, some of said tangs being bent clockwise out of the plane of said second flange, others of said tangs being bent counterclockwise out of the plane of said second flange.

References Cited in the file of this patent

UNITED STATES PATENTS

| 1,298,811 | Spiegel | Apr. 1, 1919 |
| 2,240,150 | Seyfried | Apr. 29, 1941 |